United States Patent
Seibert

(10) Patent No.: US 10,776,995 B2
(45) Date of Patent: Sep. 15, 2020

(54) LIGHT FIELDS AS BETTER BACKGROUNDS IN RENDERING

(71) Applicant: Nvidia Corporation, Santa Clara, CA (US)

(72) Inventor: Daniel Seibert, Berlin (DE)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/051,033

(22) Filed: Jul. 31, 2018

(65) Prior Publication Data

US 2019/0114825 A1  Apr. 18, 2019

Related U.S. Application Data

(60) Provisional application No. 62/573,384, filed on Oct. 17, 2017.

(51) Int. Cl.
*G06T 15/50* (2011.01)
*G06T 15/06* (2011.01)
*G06T 7/194* (2017.01)
*G06T 11/00* (2006.01)
*G06T 9/00* (2006.01)

(52) U.S. Cl.
CPC ............ *G06T 15/503* (2013.01); *G06T 7/194* (2017.01); *G06T 9/00* (2013.01); *G06T 11/00* (2013.01); *G06T 15/06* (2013.01); *G06T 15/506* (2013.01)

(58) Field of Classification Search
CPC .............................. G06T 15/06; G06T 15/506
See application file for complete search history.

(56) References Cited

U.S. PATENT DOCUMENTS

| 6,097,394 | A  | 8/2000  | Levoy et al.   |
|-----------|----|---------|----------------|
| 6,502,097 | B1 | 12/2002 | Chan et al.    |
| 6,674,430 | B1 | 1/2004  | Kaufman et al. |
| 7,133,041 | B2 | 11/2006 | Kaufman et al. |
| 7,936,392 | B2 | 5/2011  | Ng et al.      |
| 8,749,620 | B1 | 6/2014  | Knight et al.  |
| 9,237,263 | B2 | 1/2016  | Rime et al.    |

(Continued)

FOREIGN PATENT DOCUMENTS

| EP | 1508877 A2 | 2/2005 |
|----|------------|--------|
| EP | 3144885 A1 | 3/2017 |

OTHER PUBLICATIONS

Maeno et al., "Light Field Distortion Feature for Transparent Object Recognition", Jun. 2013, 2013 IEEE Conference on Computer Vision and Pattern Recognition (CVPR), pp. 2786-2793 (Year: 2013).*

(Continued)

*Primary Examiner* — Mark K Zimmerman
*Assistant Examiner* — Jonathan M Cofino

(57) ABSTRACT

The introduced method and system use a 4-dimensional (4D) light field as a background of a scene, instead of 2D background image. Realizing computing a light field takes tremendous amounts of processing power, data storage and time (even with the currently available hardware), the introduced method and system compute and store the light field before rendering a scene. To reduce the time storing and accessing the light field during the rendering process, the introduced method and system also uses a modified video codec to compress and decompress the light field as 2D images.

20 Claims, 2 Drawing Sheets

(56) References Cited

U.S. PATENT DOCUMENTS

Figure 1:
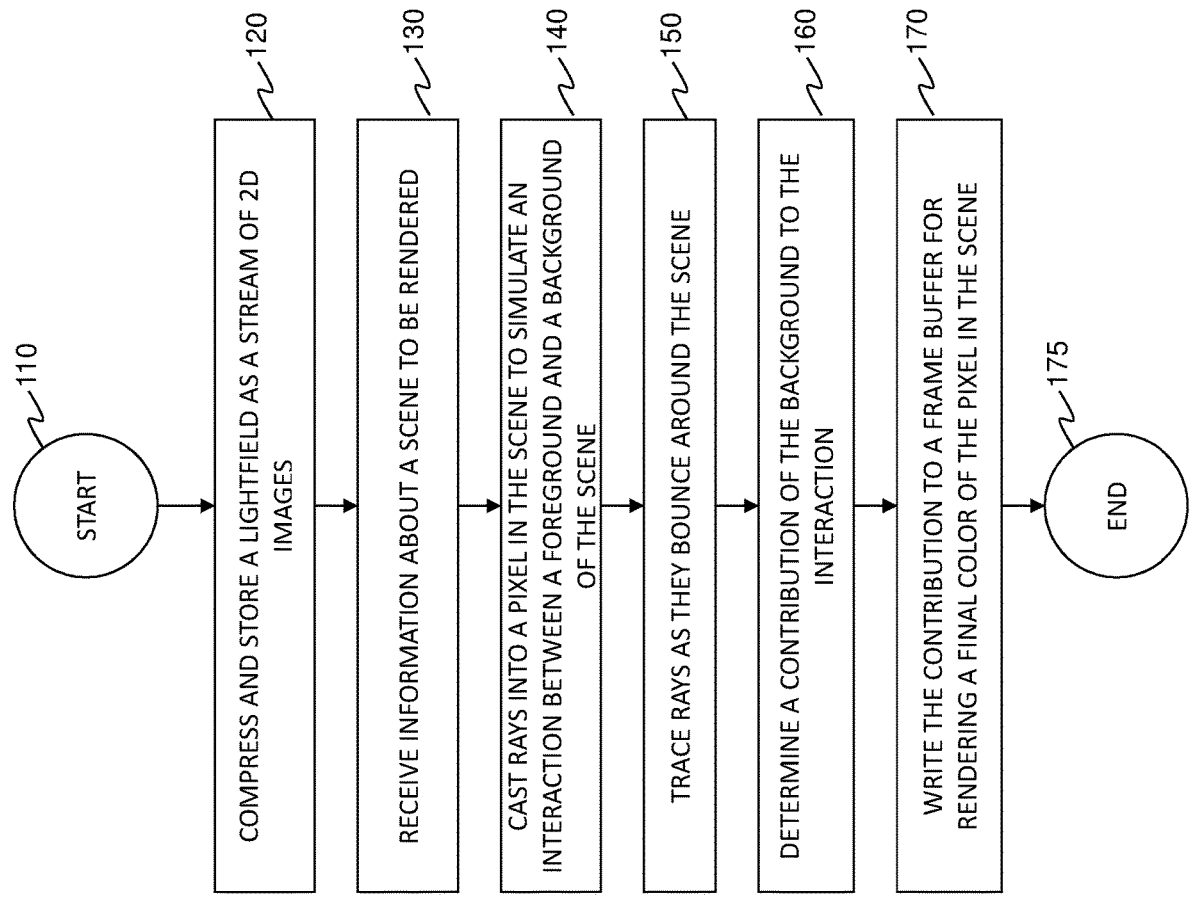

| | | | |
|---|---|---|---|
| 9,418,469 B1* | 8/2016 | Parmar | G06T 15/06 |
| 9,456,116 B2 | 9/2016 | Lapstum | |
| 9,460,515 B2 | 10/2016 | Tosic et al. | |
| 9,558,580 B2 | 1/2017 | Itoh | |
| 2007/0252074 A1* | 11/2007 | Ng | G02B 3/0056 |
| | | | 250/208.1 |
| 2008/0074420 A1* | 3/2008 | Kuesel | G06T 15/06 |
| | | | 345/426 |
| 2008/0266655 A1 | 10/2008 | Levoy et al. | |
| 2009/0128552 A1* | 5/2009 | Fujiki | G06T 19/006 |
| | | | 345/419 |
| 2010/0060637 A1* | 3/2010 | Shearer | G06T 15/06 |
| | | | 345/426 |
| 2010/0265385 A1 | 10/2010 | Knight et al. | |
| 2013/0271489 A1* | 10/2013 | Levesque | G06T 11/00 |
| | | | 345/619 |
| 2014/0313198 A1 | 10/2014 | Keller et al. | |
| 2015/0117756 A1* | 4/2015 | Tosic | G06F 17/14 |
| | | | 382/154 |
| 2015/0199838 A1* | 7/2015 | Itoh | G06T 15/06 |
| | | | 345/426 |
| 2015/0262424 A1 | 9/2015 | Tabaka et al. | |
| 2016/0021355 A1 | 1/2016 | Alpaslan et al. | |
| 2016/0307372 A1 | 10/2016 | Pitts et al. | |
| 2016/0330432 A1 | 11/2016 | Yu et al. | |
| 2017/0243022 A1 | 8/2017 | Corazza | |

OTHER PUBLICATIONS

Ihrke, I., et al., "Fast Incident Light Field Acquisition and Rendering," WSCG 2008 Conference Proceedings, Feb. 4, 2008, 8 pages.

Ng, R., et al., "Light Field Photography With a Hand-Held Plenoptic Camera," Stanford Tech Report CTSR, 2005, 11 pages.

Hahne, C., et al., "Light Field Geometry of a Standard Plenoptic Camera," 2014 Optical Society of America, Optical Express, vol. 22, Issue 22, 15 pages.

Kautz, J., et al., "An Adaptive Acceleration Structure for Screen-Space Ray Tracing," High-Performance Graphics, Aug. 1, 2015, 10 pages.

* cited by examiner

LIGHT FIELDS AS BETTER BACKGROUNDS IN RENDERING

CROSS-REFERENCE TO RELATED APPLICATION

This application claims the benefit of U.S. Provisional Application Ser. No. 62/573,384, filed by Daniel Seibert on Oct. 17, 2017, entitled "LIGHT FIELDS AS BETTER BACKGROUNDS IN RENDERING," commonly assigned with this application and incorporated herein by reference in its entirety.

TECHNICAL FIELD

This application is directed, in general, to rendering an image and, more specifically, to rendering a background in an image.

BACKGROUND

In computer graphics, e.g., a non-realtime, physically based rendering, captured (e.g., High-Dynamic-Range (HDR) photographs) or rendered (e.g., a sky model) images are commonly used for backgrounds. These images can be used as an environment map, which serves as a wrap-around background image and a light source of a scene, and/or as a backplate, which serves as a fixed-perspective background image. These images are referred to as "background images."

When background images are used to surround and light a scene, features in the background images look unconvincing as a virtual view point, e.g., camera position, of the scene deviates from the original position, i.e. the position at which the background was captured or generated. For example, when a position of a camera looking at the scene moves and shifts away from the original position, some of the features in the background images that are closer to the camera do not shift relative to those that are further away as they would in real life. Furthermore, all surfaces in the background image appear diffuse, e.g., reflection and refraction effects do not occur.

This is due to the fact that since the background images are 2-dimensional (2D) images, the only view point for correctly viewing the background images is the original position, and environment in the background images is at infinity by definition. Directional data for correctly illuminating the scene would only be available from the original position. Consequently, when projected into world-space, the background images become view-independent and lack parallax and would not be able to provide novel illumination information.

The above mentioned problems also occur when matte objects are used as a part of background images. Matte objects are placeholder geometry that is added as a stand-in for selected objects in the background images. They are used to simulate interactions between computer generated ("synthetic") foreground objects and the background, such as foreground objects casting shadows onto a matte object or the reflections of foreground objects seen in a matte objects. As the appearance of matte objects is derived from the pixels of the background images, the matte objects also look diffuse and unconvincing and lack parallax when the view point differs from the original position. It is noted that the view point is always different from the original position when taking reflection and refraction into account.

BRIEF DESCRIPTION

Figure 2:
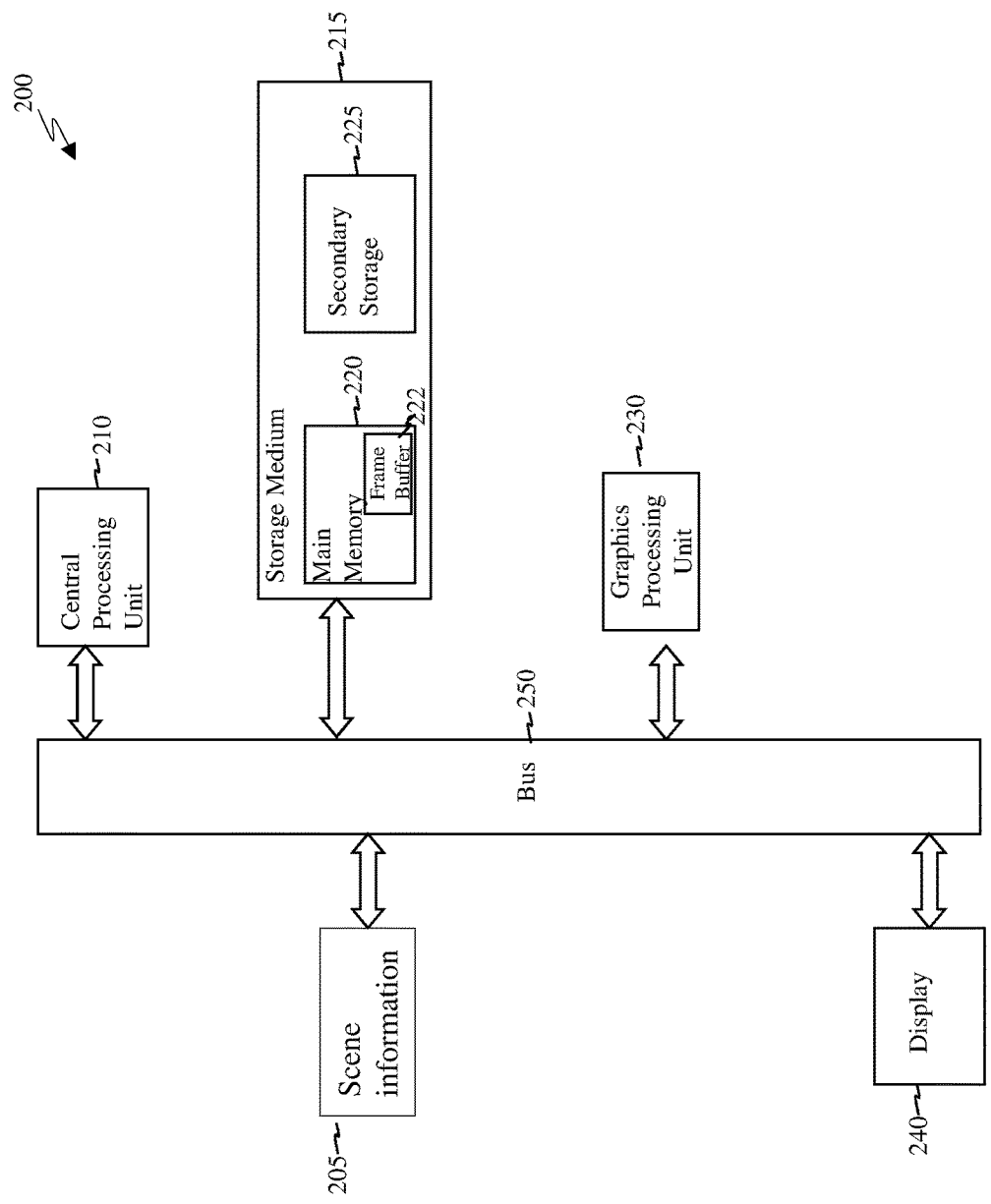

Reference is now made to the following descriptions taken in conjunction with the accompanying drawings, in which:

FIG. 1 illustrates a flow diagram of a method of employing a light field as a background in rendering, according to the principles of the disclosure; and FIG. 2 illustrates a block diagram of an example computer system configured to carry out the method of employing a light field as a background in rendering, according to the principles of the disclosure such as discussed in the context of FIG. 1.

DETAILED DESCRIPTION

The introduced method and system overcome all of the above issues by using a 4-dimensional (4D) light field as a background of a scene, instead of 2D background image. Realizing computing a light field takes tremendous amounts of processing power, data storage and time (even with the currently available hardware), the introduced method and system compute and store the light field before rendering a scene. To reduce the time storing and accessing the light field during the rendering process, the introduced method and system may use a modified video codec to compress and decompress the light field as 2D images.

During rendering, the introduced method and system access and use the stored 4D light field as a background of the scene. The introduced method and system cast rays into the scene to simulate an interaction of light with a foreground and the background of the scene. When the rays hit the background or leave the scene, the introduced method and system look up values from the 4D light field to determine the contribution of the 4D light field to the interaction.

The introduced method and system dramatically improves the rendering of the interaction of light with the foreground and the background of the scene as data for more (or all) viewing directions becomes available for background look-ups form the 4D light field. Camera/virtual view point rotations and movements (within the confines of the light field) also become possible with full parallax and with all view-dependent effects intact. Similarly, because the light field captures view-dependent illumination information, matte objects no longer appear diffuse and instead look shiny or reflective as in real-life. To accelerate the convergence of the rays to the correct solution, the introduced method and system may employ techniques such as Next Event Estimation, light tracing and photon mapping when tracing and determining weights of the rays.

FIG. 1 illustrates an embodiment of a method 100 for rendering a scene using a 4D light field as a background of a scene. In one embodiment where the light field covers all directions, it may be used as an environment map and serve both as a visible background and a light source (to illuminate the scene). In another embodiment where the 4D light field is of a parallel plane variety and thus only covers one quadrant, it may be used as a backplate serving as a fixed-perspective background image. The method may be performed by a renderer such as a physically based renderer, which is described in more details with respect FIG. 2. The method starts at step 110.

At step 120, a 4D light field representing a background of the scene is provided. The light field may be captured from a real-life scene or image or synthetically generated. In one embodiment, the light field is generated by providing, for each face of a box surrounding the scene, a 2D array (like x*y) that consists of plain, 2D flat photos having a u*v resolution taken with 6*x*y cameras. In another embodiment, the light field is generated by storing a 2D image for each point on a sphere that surrounds the scene to be rendered; the 2D images do not need to be flat and could be mapped onto a hemisphere. Access to the light field data may be parameterized as a ray, e.g., a pair of 3D position and a unit direction, and the latter may be expressed in polar coordinates. This information can be readily mapped to the native parametrization of the light field, which is usually a 2D position on the surface surrounding the light field and a direction or a pair of 2D coordinates. It is noted that light field parametrization is not limited to the above method and other parametrization methods may be used.

As the light field is computed and stored as a stream of 2D images, it may be compressed and stored on a disc and decompressed and unpacked live during rendering using existing image compression technology and texture hardware decompression on GPUs. It is noted that even when the light field is not generated as a stream of 2D images, it may still be treated as such, using a modified video codec, such as High Efficiency Video Codec (H.265 and MPEG-H Part 2) or approaches based on vector quantization. The compression techniques used is a lossy compression and may achieve data reduction by several orders of magnitude.

In one embodiment, the light field may be compressed loesslessly. In such an embodiment, it may be possible to use commonly available algorithms and existing packages that are used in regular file compression, e.g., ZIP and the like. Some preprocessing transformation transformations, e.g., one using wavelets, may also be employed to make the compression more efficient.

With the readily accessible light field, the method 100 starts rendering an image of a scene. At step 130, information for the scene to be rendered (scene information) is received. The scene information may be received from a storage medium or directly from an application using an application programming interface. The information can generally include foreground information that represents the foreground of the scene, such as at least one foreground (synthetic) object of the scene, and background information that represents the background of the scene, including matte object therein. The foreground information may include scene geometry, material information, and texture, and the background information may include the 4D light field and background images.

At step 140, the method 100 starts to generate light transport paths by casting rays into the scene. The rays are cast into the scene to simulate how light interacts with the scene such as the foreground and background thereof. As the light travels through the scene, it interacts with the light sources, backgrounds, and foreground and background objects of the scene. The rays are generated and sampled using a Monte Carlo or quasi-Monte Carlo method.

In one embodiment, the rays may be cast from a virtual view point, e.g., a view point of a camera looking at the scene, into a pixel in the scene. In another embodiment, the rays may be cast from the light field/background of the scene or from both the virtual view point and the light field/ background such as in bidirectional path tracing or photon mapping. It is noted that in the current disclosure, rays do not only include primary rays, i.e. those originate from a virtual view point or light field/light source, but also secondary rays, i.e. those that are cast from a previous intersection point in a new direction.

At step 150, the rays are traced as they bounce around the scene. Tracing includes gathering weights of the rays as they build light transport paths by reflecting or refracting off the surfaces of the objects in the foreground, i.e., synthetic objects. Each segment of a light transport path is called a light/eye subpath and they may be connected to form a number of complete paths. Contributions to the final image are made by determining the image position of any interaction between a ray and the scene and determining whether this interaction is visible from the camera position, e.g., virtual view point.

When the rays are cast from a virtual view point or the light field, the rays are traced until they hit the background (e.g., bounds of the light field) or matte object therein, leave the scene (e.g., rays hit nothing) or when the renderer determines that the path is no longer worth extending. For example, the renderer may end the tracing randomly based on "Russian roulette" or when a certain (configurable) number of interactions with the scene has been generated. Instead of waiting for the rays to hit something, e.g., background or matte objects, the method 100 may use techniques such as next event estimation (NEE) or other importance sampling techniques to actively estimate the future positions of the rays and achieve the convergence more quickly. In one embodiment, the method 100 may use NEE to estimate intersecting positions of the rays with the background based on the direction of the rays before the rays actually hit the background or leave the scene.

When the rays are cast from both the light field and the virtual view point, prefixes of the subpaths are either connected to one another to generate complete paths, e.g., by tracing rays between connection points to determine mutual visibility or by joining nearby points using nearest neighbor lookup methods, or deemed unconnectable, e.g., due to occlusion. Bidirectional path tracing and photon mapping are examples of techniques that trace rays cast from both the light field and the virtual view point.

It is understood that the steps 140 and 150 can be carried out in parallel by using wavefronts consisting of multiple rays, e.g., casting and tracing thousands of rays from virtual view points to thousands of hit points.

At step 160, a contribution of the background to the interaction of light with the foreground and the background of the scene is determined. The contribution of the background to the interaction is determined by multiplying the weights gathered from tracing the rays with the values looked up from the 4D light field at intersecting points with the rays. When the rays are cast form the virtual view point, the values are looked up from the 4D light field based on how (direction) and where (location) the rays intersect the background. When the rays are cast from the background or from both the virtual view point and the background, the contribution of the background may be determined by the positions and directions with respect to the light field, from which the rays are cast. The position and direction may be determined independently or in conjunction, using common importance sampling approaches to achieve fast convergence.

In the illustrated embodiment, the light source is a part of the background represented by the 4D light field. In one embodiment, the light source may not be a part of the background but may be a part of a synthetic object in the scene, for example, a headlight of a car. In this example, a light field may be generated once for the headlight by taking into account all the lenses and reflectors inside, and used in the place of the headlight in the scene.

Once the contributions are determined, they are written to a frame buffer of a memory of the renderer at step 170. They are used in rendering a final color of a pixel in the scene. The method 100 ends at step 175. It is understood that steps 140-160 may be repeated until enough samples (i.e. light transport paths) are accumulated to arrive at the converged solution.

FIG. 2 illustrates a block diagram of an example computer graphics rendering computer system 200 configured to employ the method of rendering a scene using a 4D light field as a background according to the principles of the disclosure such as discussed in the context of FIG. 1.

Embodiments of the system 200 can include a central processing unit (CPU) 210, e.g., configured as a host processor, and storage medium 215, such as main memory 220 (e.g., random access memory, RAM) and secondary storage 225. The storage medium 215 can non-transiently store control logic software, e.g., computer program product, and data representing a foreground and a background of the scene such as scene information 205, which includes scene geometry, material information, background images, and a 4D light field. The main memory 220 can store the final values of pixels in the scene in a framebuffer 222 after the contribution of the light field to the interaction of light with the foreground and background of the scene has been determined. Non-limiting examples of main memory 220 include, e.g., random access memory (RAM). Non-limiting examples of secondary storage 225 include hard disk drives, removable storage drive, such as floppy disk drives, a magnetic tape drive, or a compact disk drive.

Embodiments of the system 200 can also include a graphics processing unit (GPU) 230. In some embodiments, to facilitate performing steps of a rendering method such as the method 100, the GPU 230 can include a plurality of ray casting modules and ray tracing modules. In some embodiments, these modules can be further configured determine the contribution of a background/4D light field to the interaction between the foreground and the background of the scene. In other embodiments of the system 200, the CPU 210 can be configured to perform the determination.

Embodiments of the system 200 can include a display 240, e.g., a computer monitor or other user interface. In some embodiments of the system 200 a communication bus 250 can interconnect any one or more of the CPU 210, the main memory 220 and the secondary storage 225, the GPU 230, and display 240.

In some embodiments, the ray-casting modules and ray-tracing modules can be situated on a single semiconductor platform to form the GPU 230. In some embodiments the single semiconductor platform of the GPU 230 can include unitary semiconductor-based integrated circuit (IC) such as an application specific system on chip (ASIC). Embodiments of the single semiconductor platform can include multi-chip modules with increased connectivity which simulates on-chip operations to provide improvements over conventional CPU and bus implementations. In other embodiments, one or more of the components of the system 200 can be situated separately or in various combinations on different semiconductor platforms. Embodiments of the system 200 can include field programmable gate arrays (FPGAs).

Computer-readable instructions such as computer program products, including computer control logic algorithms, can be non-transiently stored in the storage medium 215, e.g., either or both of the main memory 220 and the secondary storage 225. The instructions, when executed, can cause a processor such as the CPU 210 and/or GPU 230 to perform various steps of the method of rendering a scene using a 4D light field as a background, such as any of the steps disclosed in the context of FIG. 1.

Non-limiting example embodiments of the computer system 200 include general computer systems, a circuit board system, and a game console system dedicated for entertainment purposes, an application-specific system, or other computer system familiar to one skilled in the pertinent art. For example, the computer system 200 can be embodied in the form of a desktop computer, laptop computer, personal digital assistant (PDA) device, a mobile phone device, a television, etc. In some embodiments, the computer system 200 can be coupled to a network, e.g. a telecommunications network, local area network (LAN), wireless network, wide area network (WAN) such as the Internet, peer-to-peer network, cable network, etc. for communication purposes.

Those skilled in the art to which this application relates will appreciate that other and further additions, deletions, substitutions and modifications may be made to the described embodiments.

What is claimed is:

1. A method of rendering, comprising:
   receiving information about a scene to be rendered, said information including foreground information that represents a foreground of said scene and a 4-dimensional (4D) light field that represents a background of said scene;
   casting rays from both a virtual view point and said background into said scene to simulate an interaction of light with said foreground and said background of said scene; and
   determining a contribution of said background to said interaction by employing values of said 4D light field at intersecting points with said rays, wherein said values are based at least partially on directions and locations at which said rays intersect said background.

2. The method of claim 1, further comprising compressing and storing said 4D light field as a stream of 2-dimensional images.

3. The method of claim 1, wherein said interaction includes an interaction of light with a synthetic object of said foreground and a matte object of said background.

4. The method of claim 1, wherein said values are based on a position and a direction, with which said rays intersect said background.

5. The method of claim 1, wherein said contribution is a product of said values and weights gathered from tracing said rays.

6. The method of claim 1, further comprising determining whether an image position of an interaction between at least one of said rays and said scene is visible from said virtual view point.

7. The method of claim 1, further comprising tracing at least one of said rays until said at least one ray hits a matte object of said background.

8. A renderer, comprising:
   a memory configured to store information for a scene to be rendered, said information including foreground information that represents a foreground of said scene and a 4-dimensional (4D) light field that represents a background of said scene; and
   a graphics processing unit coupled to said memory and configured to cast rays from both a virtual view point and said background into said scene to simulate an interaction of light with said foreground and said background of the scene and determine a contribution of said background to said interaction by employing values of said 4D light field at intersecting points with said rays, wherein said values are based at least partially on directions and locations at which said rays intersect said background.

9. The renderer of claim 8, wherein said 4D light field is compressed and stored in said memory as a stream of 2-dimensional images.

10. The renderer of claim 8, wherein said rays intersect said 4D light field, when said rays hit said background or when said rays are cast from said background.

11. The renderer of claim 8, wherein said interaction includes an interaction of light with a synthetic object of said foreground and a matte object of said background.

12. The renderer of claim 8, wherein said contribution is a product of said values and weights gathered from tracing said rays.

13. The renderer of claim 8, wherein said graphics processing unit is further configured to determine whether at least some of said rays connect to one another.

14. The renderer of claim 8, wherein said graphics processing unit is further configured to determine whether an image position of an interaction between at least one of said rays and said scene is visible from said virtual view point.

15. A computer program product stored in a non-transitory computer readable medium that, when executed, causes a processor to:

receive information for a scene to be rendered, said information including foreground information that represents a foreground of said scene and a 4-dimensional (4D) light field that represents a background of said scene;

cast rays from both a virtual view point and said background into said scene to simulate an interaction between said foreground and said background of said scene; and determine a contribution of said background to said interaction by employing values of said 4D light field at intersecting points with said rays, wherein said values are based at least partially on directions and locations at which said rays intersect said background.

16. The computer program product of claim 15, wherein execution further causes said processor to compress and store said 4D light field as a stream of 2-dimensional images.

17. The computer program product of claim 15, wherein said interaction includes an interaction of light with a synthetic object of said foreground and a matte object of said background.

18. The computer program product of claim 15, wherein said contribution is a product of said values and weights gathered from tracing said rays.

19. The computer program product of claim 15, causes said processor to determine whether an image position of an interaction between at least one of said rays and said scene is visible from said virtual view point.

20. The computer program product of claim 15, wherein execution further causes said processor to trace at least one of said rays until said at least one ray hit a matte object of said background.

* * * * *